US008620879B2

(12) United States Patent
Cairns

(10) Patent No.: US 8,620,879 B2
(45) Date of Patent: Dec. 31, 2013

(54) CLOUD BASED FILE STORAGE SERVICE

(75) Inventor: Ryan Cairns, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 164 days.

(21) Appl. No.: 12/859,249

(22) Filed: Aug. 18, 2010

(65) Prior Publication Data

US 2011/0087690 A1    Apr. 14, 2011

Related U.S. Application Data

(60) Provisional application No. 61/251,286, filed on Oct. 13, 2009.

(51) Int. Cl.
*G06F 17/00* (2006.01)
(52) U.S. Cl.
USPC .......... 707/692; 707/661; 707/706; 713/168; 713/189; 726/26; 709/217
(58) Field of Classification Search
None
See application file for complete search history.

(56) References Cited

U.S. PATENT DOCUMENTS

| 5,396,537 | A | 3/1995 | Schwendeman |
|---|---|---|---|
| 6,401,239 | B1 | 6/2002 | Miron |
| 6,493,758 | B1 | 12/2002 | Mclain |
| 6,697,841 | B1 | 2/2004 | Sheffield et al. |
| 7,022,075 | B2 | 4/2006 | Grunwald et al. |
| 7,349,955 | B1 | 3/2008 | Korb et al. |
| 7,366,767 | B2 | 4/2008 | Sheffield et al. |
| 7,752,391 | B2 | 7/2010 | Cornwell et al. |
| 7,805,286 | B2 | 9/2010 | Jorgensen et al. |
| 7,987,289 | B2 * | 7/2011 | Mason et al. ............ 709/242 |
| 2006/0031781 | A1 | 2/2006 | Keohane et al. |
| 2006/0184626 | A1 | 8/2006 | Agapi et al. |
| 2006/0253680 | A1 | 11/2006 | Vitanov et al. |
| 2006/0277098 | A1 | 12/2006 | Chung et al. |
| 2007/0204057 | A1 | 8/2007 | Shaver et al. |
| 2007/0288591 | A1 | 12/2007 | Wong et al. |
| 2007/0294773 | A1 | 12/2007 | Hydrie et al. |
| 2008/0005686 | A1 | 1/2008 | Singh |
| 2008/0154732 | A1 | 6/2008 | Whittaker et al. |

(Continued)

FOREIGN PATENT DOCUMENTS

WO    2011046931 A1    4/2011
WO    2011047060 A1    4/2011

OTHER PUBLICATIONS

Ateniese et al, "Provable Data Posession at Untrusted Stores", ACM, 2007.*

(Continued)

*Primary Examiner* — Hung Le
(74) *Attorney, Agent, or Firm* — Brake Hughes Bellermann LLP

(57) ABSTRACT

A server receives from a user's computer a request to store a file and a file hash value. The server determines whether a file with the same hash value is stored on the server. If so, the server grants access to the server's file copy. If not, the server requests the user to upload the file and stores it. The server grants access to the copy by sending the user a pointer to the copy's storage location and associating the user with the pointer in a database. The server can challenge the user's right to access the copy by requesting a file password or a portion of the file stored on the user's computer. The server can limit access to the server's copy to users who successfully respond to the challenge.

20 Claims, 4 Drawing Sheets

(56) References Cited

U.S. PATENT DOCUMENTS

| | | | |
|---|---|---|---|
| 2008/0194332 A1 | 8/2008 | Kadikario et al. | |
| 2008/0222506 A1 | 9/2008 | Petri | |
| 2008/0222628 A1 | 9/2008 | Batra | |
| 2008/0276098 A1* | 11/2008 | Florencio et al. | 713/183 |
| 2008/0301435 A1* | 12/2008 | Simon | 713/155 |
| 2009/0164527 A1 | 6/2009 | Spektor et al. | |
| 2009/0164560 A1 | 6/2009 | Fiatal | |
| 2009/0171715 A1 | 7/2009 | Conley et al. | |
| 2009/0205036 A1* | 8/2009 | Slaton et al. | 726/9 |
| 2010/0107225 A1* | 4/2010 | Spencer et al. | 726/4 |
| 2010/0161759 A1* | 6/2010 | Brand | 709/218 |
| 2010/0179987 A1 | 7/2010 | Sebastian et al. | |
| 2010/0191783 A1* | 7/2010 | Mason et al. | 707/822 |
| 2010/0211781 A1* | 8/2010 | Auradkar et al. | 713/168 |
| 2010/0211782 A1* | 8/2010 | Auradkar et al. | 713/168 |
| 2010/0222401 A1* | 9/2010 | Li et al. | 514/384 |
| 2010/0332456 A1* | 12/2010 | Prahlad et al. | 707/664 |
| 2011/0006881 A1* | 1/2011 | Hogaboom et al. | 340/5.83 |
| 2011/0022642 A1* | 1/2011 | deMilo et al. | 707/805 |
| 2011/0072487 A1* | 3/2011 | Hadar et al. | 726/1 |
| 2011/0087603 A1 | 4/2011 | Garcia et al. | |
| 2011/0087776 A1 | 4/2011 | Tabone et al. | |
| 2011/0087960 A1 | 4/2011 | Tabone et al. | |
| 2011/0088039 A1 | 4/2011 | Tabone et al. | |
| 2011/0113337 A1 | 5/2011 | Liu et al. | |
| 2012/0022954 A1 | 1/2012 | Garcia et al. | |
| 2012/0023404 A1 | 1/2012 | Liu et al. | |

OTHER PUBLICATIONS

Cachin et al, "Tursting the Cloud", IBM Research, Zurich Research Laboratory, Switzerland, 2009.*
Curtmola et al, "Robust Remote Data Checking", ACM, 2008.*
Itani et al, "Privacy as a Service: Privacy-Aware Data Storage and Processing in Cloud Computing Architectures", IEEE, Sep. 2009.*
Wang et al, "Ensuring Data Storage Security in Cloud Computing", Department of ECE, Illinois Institute of Technology, Jul. 2009.*
"TPM Main Part 3 Commands" TCG Published, Specification Version 1.2, Level 2, Revision 103, Jul. 9, 2007, 330 pages.
Non-Final Office Action for U.S. Appl. No. 12/903,190, mailed Jan. 9, 2012, 15 pages.
Search Report and Written Opinion for International Application No. PCT/US2010/052522, mailed Mar. 7, 2011, 11 pages.
"Online and Offline", Wikipedia, the free encyclopedia, retrieved on Jun. 13, 2010 from http://en.wikipedia.org/wiki/Online_and_offline, 4 pages.
"Review: Memopal Online Backup and Storage", Gear Diary, May 5, 2009, 10 pages.
TPM Main Part 1 Design Principles, TCG Published, Specification Version 1.2, Level 2, Revision 103, Jul. 9, 2007, 182 pages.
"TPM Main Part 2 TPM Structures", TCG Published, Specification version 1.2, Level 2, Revision 103, Jul. 9, 2007, 198 pages.
"Content (media)", Wikipedia, the free encyclopedia, retrieved on Jun. 13, 2010 from http://en.wikipedia.org/wiki/Content_(media), 2 pages.
"Trusted Platform Module", Wikipedia, the free encyclopedia, retrieved on Jun. 24, 2010 from http://en.wikipedia.org/wiki/Trusted_Platform_Module, 4 pages.
Cox, et al, "Pastiche: Making Backup Cheap and Easy", Proceedings of the 5th Symposium on Operating Systems Design and Implementation, vol. 36, Dec. 9-11, 2002, 15 pages.
Lee, et al, "Interactive Contents Player for Rich Media Service", IEEE Transactions on Consumer Electronics, vol. 1, No. 55, Feb. 2009, 7 pages.
Mandagere, et al, "Demystifying Data Deduplication", Proceedings of the ACM Middleware '08 Companion, Dec. 1-5, 2008, 6 pages.
Muthitacharoen, "A Low-Bandwidth Network File System", Proceedings of the ACM Symposium on Operating Systems Principles, Oct. 21, 2002, 14 pages.
Search Report and Written Opinion for International Application No. PCT/US2010/052320, mailed Feb. 23, 2011, 13 pages.
Wathsala, et al, "Next Generation Proxy Servers", 10th International Conference on Advanced Communication Technology, Feb. 17-20, 2008, 4 pages.
Non-Final Office Action Response for U.S. Appl. No. 12/859,249, filed May 31, 2012, 10 pages.
Final Office Action for U.S. Appl. No. 13/246,841, mailed Mar. 20, 2012, 21 pages.
Non-Final Office Action for U.S. Appl. No. 13/246,841, mailed Nov. 7, 2011, 13 pages.
Final Office Action for U.S. Appl. No. 13/246,848, mailed May 16, 2012, 13 pages.
Non-Final Office Action for U.S. Appl. No. 13/246,848, mailed Dec. 8, 2011, 11 pages.
Final Office Action for U.S. Appl. No. 12/904,131, mailed Nov. 19, 2012, 22 pages.
Non-Final Office Action for U.S. Appl. No. 12/904,129, mailed Oct. 3, 2012, 28 pages.
Non-Final Office Action for U.S. Appl. No. 12/904,131, mailed Jul. 19, 2012, 18 pages.
Non-Final Office Action Response for U.S. Appl. No. 12/904,131, filed Oct. 15, 2012, 12 pages.
RCE for U.S. Appl. No. 13/246,848, filed Oct. 1, 2012, 3 pages.
Edit; Microsoft Computer Dictionary; May 1, 2002; Microsoft Press; 5th Edition; p. 234.
Final Office Action Response for U.S. Appl. No. 12/903,190, filed Nov. 19, 2012, 10 pages.
Non-Final Office Action Response for U.S. Appl. No. 12/903,190, filed Jun. 11, 2012, 18 pages.
Final Office Action Response and RCE for U.S. Appl. No. 12/903,190, filed Dec. 18, 2012, 13 pages.
Final Office Action for U.S. Appl. No. 12/903,190, mailed Jul. 19, 2012, 11 pages.
Advisory Action for U.S. Appl. No. 12/903,190, mailed Dec. 13, 2012, 5 pages.
Final Office Action Response for U.S. Appl. No. 13/246,848, filed Aug. 13, 2012, 14 pages.
Advisory Action for U.S. Appl. No. 13/246,848, mailed Aug. 24, 2012, 3 pages.
Final Office Action Response and RCE for U.S. Appl. No. 13/246,841, filed Jun. 20, 2012, 16 pages.
Non-Final Office Action for U.S. Appl. No. 13/246,841, mailed Jul. 25, 2012, 33 pages.
Non-Final Office Action for U.S. Appl. No. 12/904,135, mailed Aug. 24, 2012, 25 pages.
Non-Final Office Action for U.S. Appl. No. 12/904,132, mailed Dec. 5, 2012, 20 pages.

* cited by examiner

CLOUD BASED FILE STORAGE SERVICE

CROSS REFERENCE TO RELATED APPLICATIONS

This application claims the benefit of U.S. Provisional Application No. 61/251,286, filed Oct. 13, 2009, and titled "Power Management and Data Caching in a Computer Platform," which is incorporated herein by reference in its entirety.

TECHNICAL FIELD

This document relates to systems and techniques for off-line storage and caching of data.

BACKGROUND

With the creation of the world-wide-web and high speed computer networks, the paradigm for personal computer usage has dramatically shifted. In the past, users would primarily use their personal computers to run programs, and store and manipulate data that was located on their local hard-drive. Only rarely would users store or manipulate data located on a networked drive, or run a program that was provided as a network service, and even then, the programs and data were usually restricted to a local area network. Today, more and more users are storing more and more data on remote data servers, and using remotely provided web-based applications (e.g., SaaS or Software as a Service programs) to manipulate and organize that data. For example, many users today store their personal email and contact information, and even pictures, videos, and music archives on remote servers, and access that data using third party applications that are provided through and controlled by a web-browser.

Cloud computing is a style of computing in which computing resources such as application programs and file storage are remotely provided over the Internet, typically through a web browser. Many web browsers are capable of running applications (e.g., Java applets), which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program.

Due to this shift in computer usage, today's computer users are unlikely to want or need many of the bells and whistles provided by modern operating systems. They do not need to worry about file structures or organizing or backing up their data, because much of their data is stored, organized and backed up for them on the cloud. They do, however, require a safe and reliable method to upload data and files to a network or cloud-based server. Moreover, the provider of that upload service needs an efficient and reliable way to receive, store and grant access to uploaded files.

SUMMARY

This document describes systems and techniques that may be used to upload and store documents and files from a cloud-optimized client computer to a cloud-based document storage server or service. The cloud-optimized computing device may be a desktop, notebook or netbook computer, or a mobile device such as a personal digital assistant or smart phone.

In general, in one aspect, a computer implemented method for storing files on a cloud-based server is disclosed. The cloud-based server receives a request from a user to store a file on the server. The cloud-based server also receives from the user a hash value for the file. The server then determines whether a file with a hash value that is identical to the received hash value is already stored on the server. If a file with a hash value that is identical to the received has value is already stored on the server, the server grants the user access to the server's copy of the file. If a file with a hash value that is identical to the received hash value is not already stored on the server, the server requests the user to send a copy of the file to the server. The server receives the copy of the file, stores the copy on the server, and grants the user the right to access the server's copy of the file.

Features and advantages of the invention include one or more of the following. The server can grant the user the right to access the copy of the file that is stored on the server by sending the user a pointer to the file's storage location on the server. The server can associate the username of the user with the pointer to the file's storage location on the server in a data repository such as a database. When the server already stores a file with a hash value that is identical to the received hash value, the server can challenge the user's right to access the copy of the file that is stored on the server. The challenge can be a request for the user to send to the server a password for the copy of the file that is stored on the server. The challenge can also be a request for the user's computer to send to the server a portion of the copy of the file that is stored on the user's computer. The server receives the user's response to the challenge, and determines based on the response whether the user has the right to access the copy of the file that is stored on the server. If the server determines the user successfully responded to the challenge, the server grants the user the right to access the server's copy of the file.

In general, in another aspect, a computer implemented method for requesting the storage of files on a cloud-based server is disclosed. The method involves a client computer determining a hash value for a file to be stored on a server. The client computer then sends a request to the server to store the file. The client computer also sends the hash value for the file. The client computer than receives from the server a response granting the user the right to access the server's copy of the file.

Features and advantages of the invention include one or more of the following. If the server does not currently store a copy of the file, the client computer receives a request from the server to upload the file, and sends a copy of the file to the server. If the server currently does store a copy of the file, the client computer receives from the server a challenge to the right to access the file, and prepares and sends a response to the challenge to the server. The challenge can be a request to send a password to access the server's copy of the file, and the client computer can send a password for the file to the server in response to the server's challenge to access the server's copy of the file. The challenge can be a request to send a portion of the client computer's copy of the file, and the client computer can send the requested portion of the file to the server in response to the server's challenge to access the server's copy of the file. The client computer can receive from the server a pointer to storage location of the server's copy of the file in order to access the server's copy of the file.

The details of one or more embodiments are set forth in the accompanying drawings and the description below. Other

DESCRIPTION OF DRAWINGS

Like reference symbols in the various drawings indicate like elements.

DETAILED DESCRIPTION

As user's transition from a conventional computing paradigm (where the user's data and application programs are stored and executed on local computing resources) to a cloud computing paradigm (where the user's data and application programs are stored and executed on a remote server accessed over a network cloud), large amounts of user data will be stored on remotely networked or cloud-based servers. However, much of the data that will be stored by different users will be identical. For example, many users may wish to store their MP3 music files on the cloud-based server, and many users will undoubtedly store the same MP3 files corresponding to the same songs or albums. Though the cost of data storage has dramatically decreased in price over time, it is still inefficient for the provider of a cloud-based file storage service to store identical data in multiple independent copies, particularly when the number of independent copies gets large as would be the case for the storage of popular music or movie files. Consequently, cloud based service providers will find it convenient to store a single copy of uniquely identifiable data or files, and allow multiple users to share that single copy provided they are authorized to access the data or files.

Figure 1:
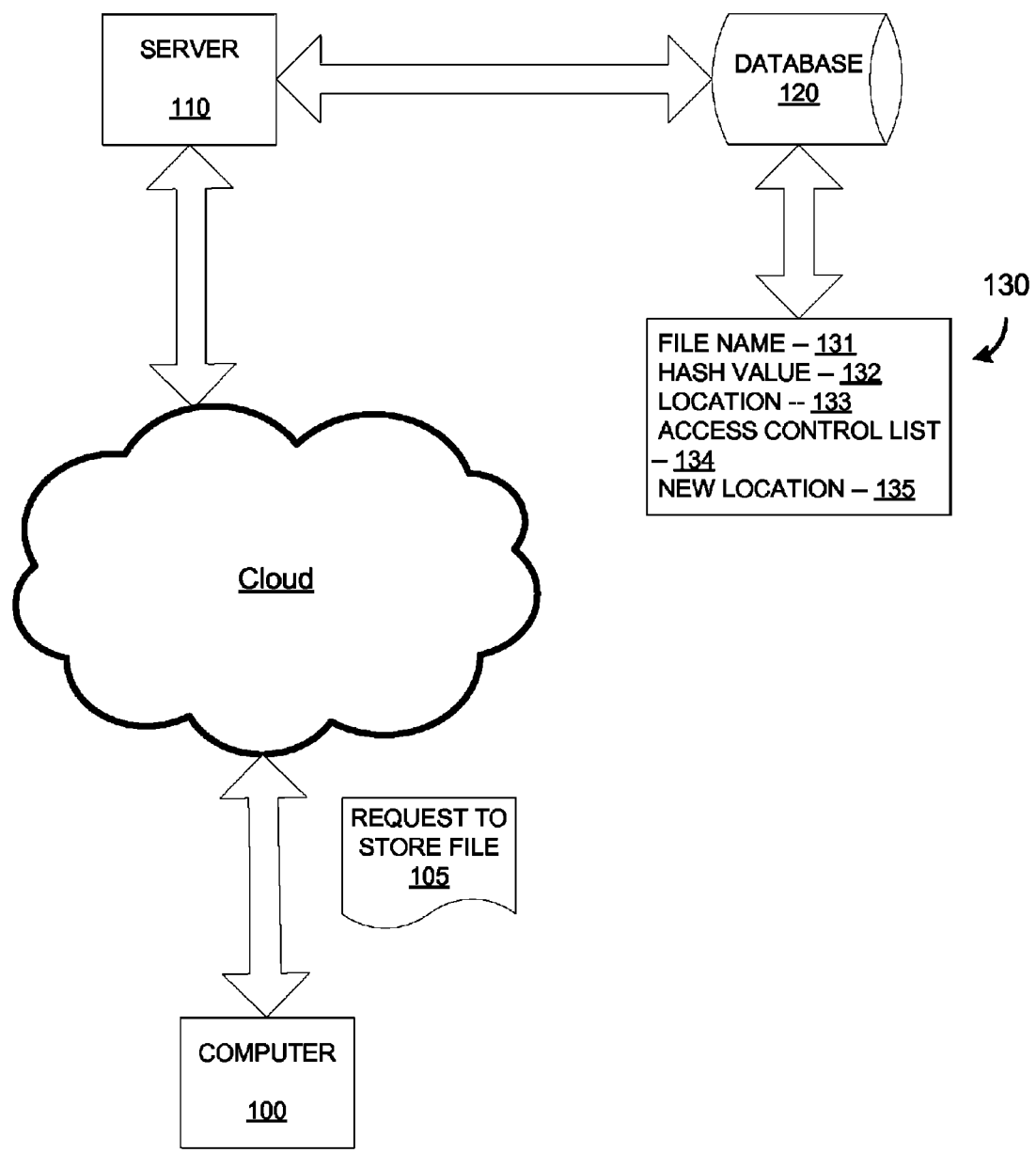
FIG. 1 is a schematic illustration of a cloud-based file storage system.

FIG. 1 is a schematic illustration of a cloud-based file storage system. As shown in FIG. 1, a user on a client computer 100 can send a request 105 to a remote cloud-based server 110 to store a copy of a file that is located on computer 100. The request can include the hash value of the file whose storage is requested. Computer 100 determines the hash value from its own copy of the file, and sends the hash value to server 110 either separately or as part of the request 105. Upon receiving the storage request 105, remote server 110 can determine whether it already stores a copy of the file by determining whether it stores a file having the same hash value as the file whose storage is requested. For example, the remote server 110 can maintain a database 120 whose records contain information about the files stored on remote server 110. Each record in the database, such as record 130, can contain the file name 131, hash value 132, a pointer or storage location 133 for the file 131 on the remote server 110, a pointer to the storage location of an access control list 134 for the file 131, and a pointer to a new or most recently updated file location 135. The access control list 134 can contain information about any access rights that are required for a user to access file 131. For example, access control list 134 can contain a list of users that are permitted to access file 131, and the rights granted to each such user such as the right to read, edit or delete file 131. Access control list 134 can also contain information that is needed to access file 131, such as a password or a the location of a small snippet of data from file 131 the user is required to have in order to access file 131.

Server 110 can search database 120 for a file having a hash value 132 that is identical to the hash value sent from computer 100. If no such file is found, server 110 can request computer 100 to upload a copy of the file, can store the file, and can create a record for the file, such as database record 130, in database 120. If, however, server 110 finds that it is storing a file 131 having a hash value 132 that is identical to the hash value received from computer 100, the server 110 can use the file's access control list 134 to determine if the user is permitted to access the file, and if so, what permissions the user has to read, edit and delete the file. In addition to identify particular users who are permitted to access file 131, the access control list 134 can also grant general file access to any user who wishes to access the file. The access control list 134 can also specify particular access rights that are granted to users who are permitted to access file 131. For example, access control list 134 can specify that only the user that uploaded file 131 can read, edit and delete the file, and that any other user has read-only permission to access file 131. If a user is not permitted to access the server's copy of the file 131, server 110 can deny the user the right to access the file 131. If, however, the user is permitted to access the server's copy of the file 131, server 110 can use the access control list 134 to determine any particular access right restrictions 134 of the file 131, such as password protection. If the file 131 has access right restrictions 134, the server 110 can send computer 100 a challenge to access file 131. For example, server 110 can request computer 100 to send a password for file 131, or a small snippet of data from the computer 100's own copy of the file to prove that the user of computer 100 already has access to the file. Upon receiving computer 100's response to the access challenge, server 110 can verify whether the user of computer 100 has the right to access file 131 and either grant or deny access. If the user of computer 100 has the right to access file 131, server 110 can send the pointer or storage location 133 of file 131 to the user of computer 100.

Figure 2:
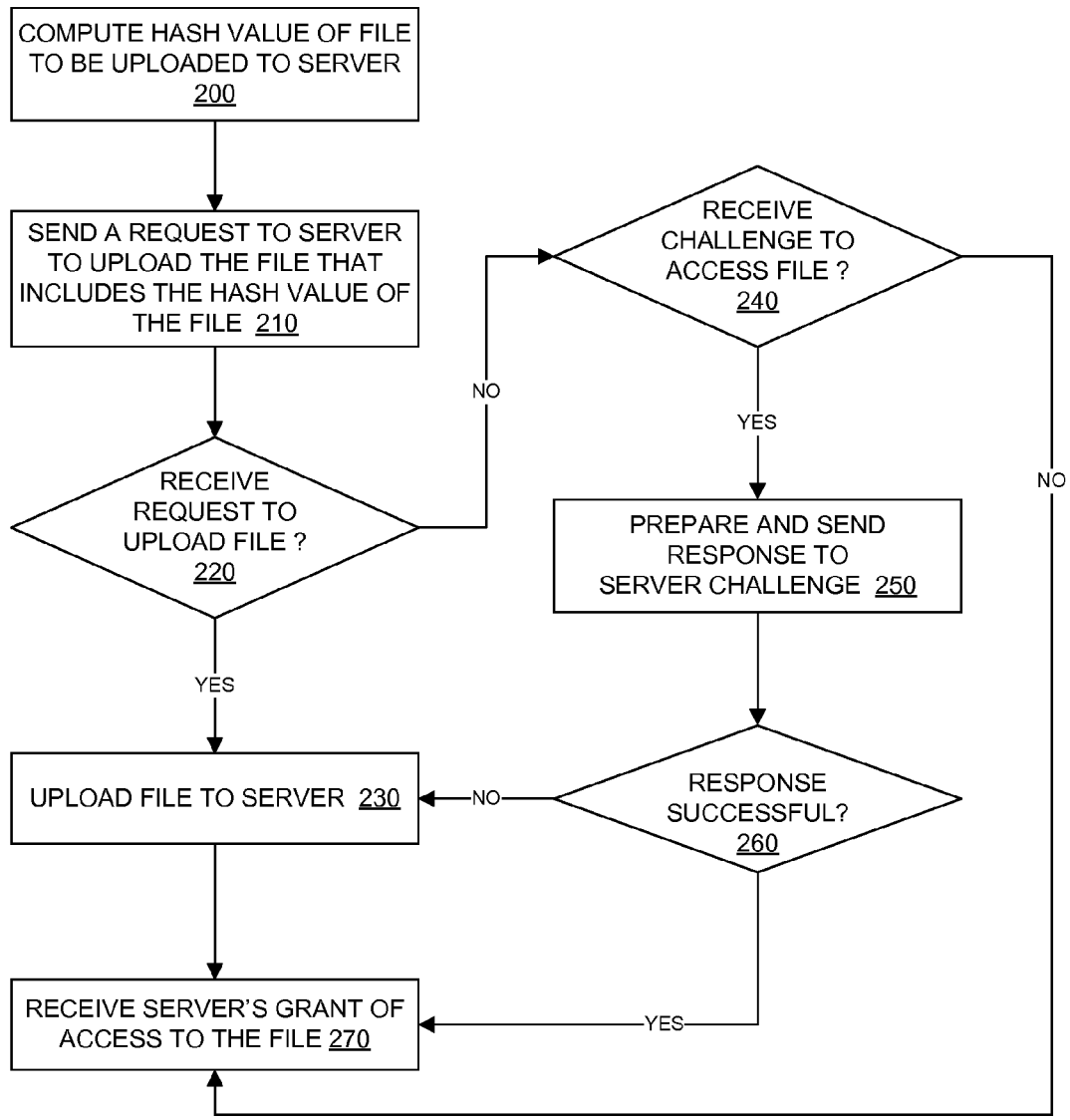
FIG. 2 is a flow chart illustrating a method for uploading a file to a remote cloud-based server.

FIG. 2 is a flow chart disclosing a method for uploading a file to a remote network server. As shown in FIG. 2, a user wishing to upload a file 131 to a remote server 110 first computes on a local client computer 100 a hash value for the file (200). The user then sends, through the client computer 100, an upload request 105 to the server 110 and the computed hash value for the file (210). The hash value of the file can be sent as part of the upload request 105 or independently of the upload request. Upon receiving the upload request 105 and the hash value of the file, the server 110 uses the received hash value to determine if it is already storing a copy of the file. If the server 110 determines it is not already storing a copy of the file, the server 110 sends the client computer 100 a request to upload the file. The client computer 100 receives this request (220), and sends (uploads) the file or a copy of the file to the server (230). Upon receiving the file, the server 110 stores the file and creates a record for the file in a data repository, such as a record 130 in a database 120, and grants the user the right to access the file. The server 110 can then send the user a pointer 133 to the location of the server's copy of the file. The client computer 100 receives the server's grant of access to the file (270), which can be a pointer 133 to the file's storage location on the server 110. Thereafter, whenever the user logs into his or her account on the server 110, he or she will be able to access the file 131 by retrieving the pointer 133 to the file 131 from the server's 110 database record 130.

If, however, the server 110 determines it is already storing a copy of the file 131, the server 110 may determine if the user is permitted to access that copy of the file 131 based on the file's access control list 134, and may challenge the user's right to access that copy of the file (240). For example, if the user is requesting to upload an MP3 file 131, the server may challenge the user to determine whether the user already has access to the file 131 on the user's own computer 100 or otherwise has the right to access the file 131. The challenge may consist of requesting the user to send a password or authorization code for the file or requesting the user's computer to send a snippet or small amount of data from the copy of the file that is stored on the user's computer 100. For example, the server 110 can request the user's computer 100 to send a sequence of bits from a copy of the file that is stored on the user's computer 100. The sequence of bits can be the same sequence (e.g., the first 1000 bytes of the file) or a random sequence (e.g., the first 1000 bytes after the Nth byte of the file, where N is a randomly generated number). If the server 110 requests a random sequence from the file 131, the client computer 100 would have to send the server 1110 the size of the file 131 so that the server 110 could request a random sequence that began at a number N that was less than or equal to the size of the file 131, less the size of the requested sample.

If the server 110 sends an access challenge, the client computer 100 receives the challenge (240), and prepares and sends a response (250). The response can consist of a password for the file 131 or of a small amount of data taken from the copy of the file that is stored on the user's computer 100 at the requested location in the file 131. When the server 110 receives the response to the challenge, it determines whether the user is authorized to access the server's 110 copy of the file 131 as explained more fully below. If the user is authorized to access the server's 110 copy of the file 131, i.e., if the user's response to the access challenge is successful (260), the user receives from the server 110 the right to access the file (270). Access can be granted, for example, by receiving a pointer 133 to the location of the server's copy of the file 131. Once access to the server's copy of the file 131 is granted, the user can delete the copy that is stored on the user's computer 100, since the user will thereafter be able to access and download the copy 131 that is stored on the server 110.

In some implementations, the server's 110 challenge of the user's right to access a copy of a file 131 that is already stored on the server 110 may only be selectively applied, or may not be applied at all. For example, if a user wishes to upload a public domain file 131 that is already stored on the server 110, such as an IRS publication, the server 110 may grant the user the right to access the file 131 without challenging the user's authority to view the file 131. Information indicating a user's rights to access a file 131 can be stored in the file's access control list 134. If the file 131 is publically accessible, the access control list 134 can indicate that any user can access the file 131 in read-only mode, and server 110 can grant any user the right to access the file 131 without challenging the user's credentials to do so. If, however, the access control list 134 indicates that only specified users are permitted to access the file 131, the server 110 may limit access to only those users who are listed in the file's 131 access control list 134. Moreover, if the access control list 134 indicates that users must verify their right to access the file 131, the server 110 can issue the user challenge outlined above to ensure that only authorized users gain access to the file 131. If server 110 does not challenge the user's right to access a file 131 that is already stored on the server (240), the user receives a grant of access to the file (270).

Figure 3:
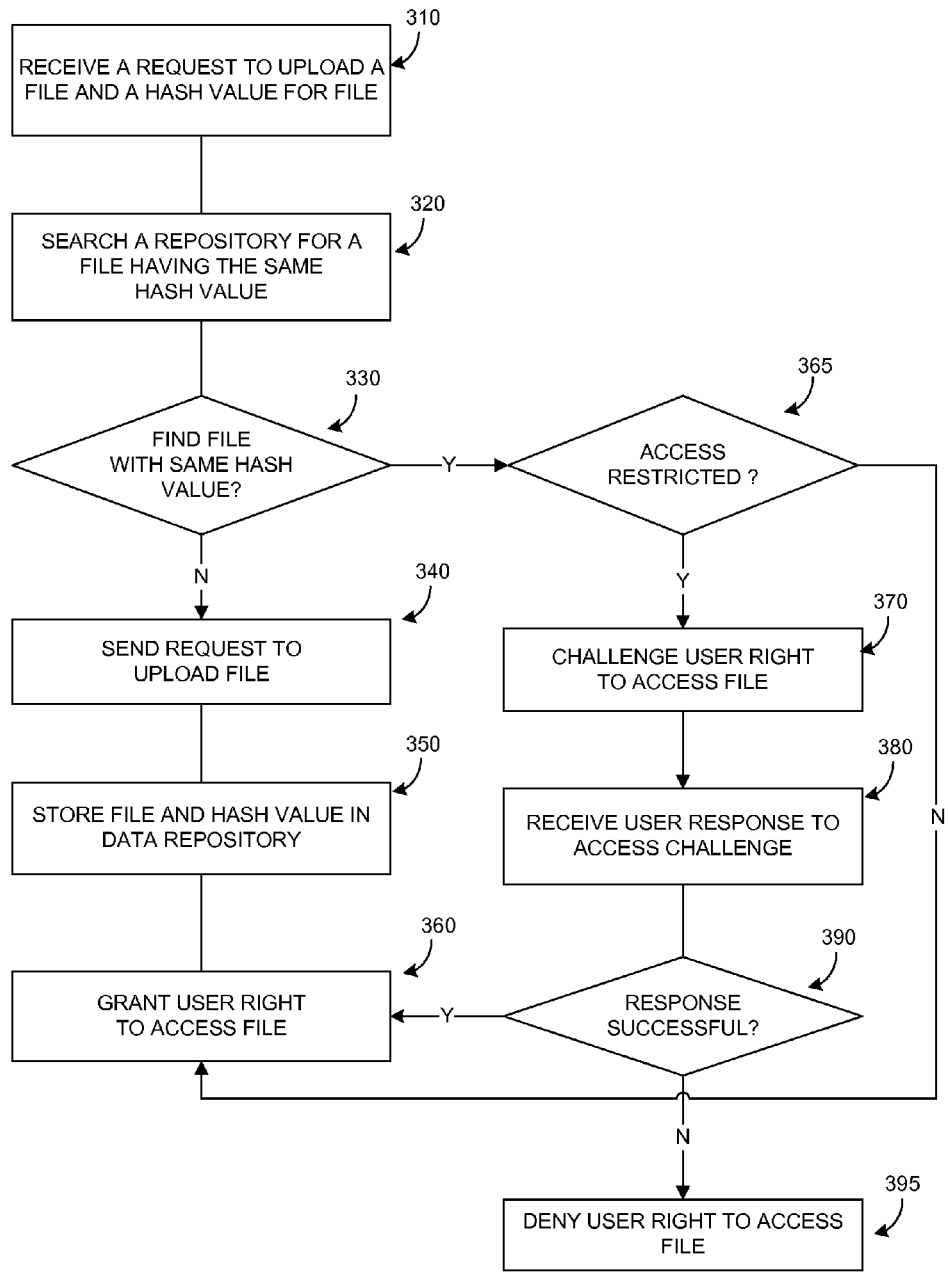
FIG. 3 is a flow chart illustrating a method for granting a user access to a file stored on a remote cloud-based server.

FIG. 3 is a flow chart disclosing a method for granting a user access to a file stored on a remote server. As shown in FIG. 3, a user wishing to upload a file to the remote server 110 sends, through the user's client computer 100, an upload request 105 to the server 110 and a hash value of the file. As before, the server 110 can receive the hash value of the file as part of the upload request 105 or in an independent transmission. The server 110 receives the request 105 and hash value of the file (310), and uses the received hash value to determine if it is already storing a copy of the file by searching a data repository for a file having the same hash value (320). For example, the server 110 can search a file storage database 120 for a record that contains the received hash value, and that relates the received hash value to a storage location of a file having that hash value. If the server 110 does not find a locally stored file having the same hash value (330), it sends the client computer 100 a request to upload the file (340). The client computer 100 then sends the file to the server 110. Upon receiving the file, the server can store the file and information about the file such as its hash value in a data repository (350). For example, the server 110 can store information about the file, such as its name 131, hash value 132, storage location 133 and access control list 134, as a database record 130 in a database 120. The server 110 can then grant the user the right to access the file (360). This can be done, for example, by sending the user the pointer 133 to the file's storage location. Thereafter, whenever a user logs into his or her account, he or she will be able to access the file 131.

If the server 110 determines from the upload request 105, however, that a copy of the file 131 is already stored on the server (330), the server 110 can determine whether the user has any right to access to the file (365). Access to a file stored on the server can be restricted, for example, if the file is a private file or is copyright protected. To determine if the user had the right to access the file 131, the server 110 can consult the file's access control list 134. The access control list 134 can store information such as the names of users who are permitted to access the file 131, and the access rights granted to such users (e.g., read, edit, delete). The access control list 134 can also store information indicating whether a user is required to verify his or her right to access the file, and can store the verification information such as a password, a small snippet of data taken from the file, or the checksum for a small snippet of data taken from the file. If access to the file is not restricted (365), the server 110 can grant the user the right to access the file without challenging the user's credentials to view it (360). If, however, access to the file is restricted (365), the server 110 can issue the user a challenge to determine if the user is permitted to access the file (370). The challenge may consist of requesting the user to send a password for the file 131, a small amount of data from the copy of the file that is stored on the user's computer 100, or the checksum for that small amount of data.

When the server 110 receives the user's response to the challenge (380), it determines whether the user is authorized to access the file. For example, if the server 110 requested a password for the file, the server 110 determines whether the password received from the user is identical to the password that is associated with the server's 110 copy of the file 131. Alternatively, if the server 110 requested a snippet of data from the file 131, the server 110 determines whether the snippet of data received from the user's computer 100 is identical to the same snippet from the server's copy of the file 131. Likewise, if the server 110 requested the checksum for such a snippet of data, the server 110 determines whether the checksum received from the user's computer 100 is identical to the checksum for the same snippet of data taken from the server's copy of the file 131. If the server 110 receives a successful response to the access challenge (390), it grants the user access to the file (360). If, however, the server 110 receives an unsuccessful response to the challenge (390), it denies the user the right to access the file (395).

One important aspect of the disclosed file upload and storage process is that the user requests the server 110 to upload and store the file prior to actually sending the file. The networked or cloud-based server 110 then determines whether it already stores a copy of the file 131, and only requests the upload of the file if it does not already store a copy of the file. This preserves not only networking resources by avoiding the transmission of files that are not needed because they are already stored on the server, but also the computing resources of both the user's client computer 100 and the network based server 110. This method of file upload and storage is particularly useful when the file to be uploaded is a large file, such as a movie, and is especially useful in the typical situation where the client computer 100 interacts asymmetrically with the network or cloud-based server 110. For example, many users connect to the Internet using digital subscriber line (DSL) or Data Over Cable Service Interface Specification (DOCSIS) modems. These modems asymmetrically allocate bandwidth, and provide much more bandwidth for the download of information from a network based server 110 to a user's computer 100 than for the upload of information from the user's computer 100 to the network based server 110. Thus, it is faster and more efficient for the user's computer 100 to initially send a low bandwidth message such as an upload request 105 and a document checksum or hash value to the network based server 110, and to send the actual file only when the network based server 110 is not already storing a local copy of the file.

Figure 4:
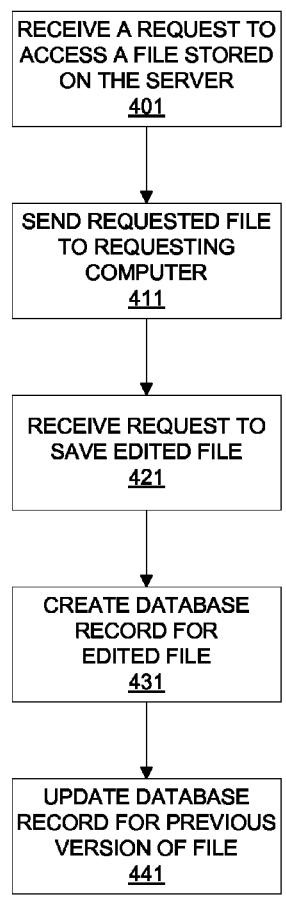
FIG. 4 is a flow chart illustrating a method for handling edits to a file stored on a remote cloud-based server.

FIG. 4 is a flow chart illustrating a method for handling edits to a file stored on a remote cloud-based server. As shown in FIG. 4, a server 110 receives a request to access a file 131 that is stored on the server (401). The server 110 can determine whether the user is permitted to access the file 131 by consulting the file's access control list 134, as explained above. If the user is permitted to access the file 131, the server 110 can send the user a copy of the file (411). If the access control list 134 indicates the user is only permitted to have read-access to the file 131, the server 110 can send the user a read-only copy of the file 131. If, however, the access control list 134 indicates the user is permitted to have write or edit access to the file 131, the server 110 can send the user a read-write copy of the file 131. In such cases, the server 110 can subsequently receive from the user a request to save an edited version of the file (421).

The server 110 can treat a request to save an edited version of a file 131 as a request to store a new file, and can process the request as explained above in reference to FIG. 3. In particular, the server 110 can request the computer 100 to send the edited version of the file and can store the edited version as a new file on the server 110. In doing so, the server 110 can create a new database record for the edited version of the file in the database 120 (431). As shown in FIG. 1, the database record can include the name of the edited version of the file, its hash value, a pointer to its storage location on server 110, and an access control list. The access control list for the edited version of the file can be copied from the access control list 134 for the unedited version of the file 131. In this way, users who had permission to access the unedited version of the file 131 are granted the same permissions to access the edited version of the file. Alternatively, an entirely new access control list can be created for the unedited version of the file. For example, access rights to the edited version of the file can be created by the user who requested server 110 to store the edited version of the file.

In addition to creating a database record for the edited version of the file, server 110 can edit and update the database record 130 for the unedited version of the file (441). In particular, the server 110 can include in the database record 130 a pointer 135 to the storage location of the edited version of the file. A user's ability to read the pointer 135 to the location of the edited version of the file can be controlled by a flag in the access control list 134 for the unedited version of the file 131. In this way, the ability of a given user to be pointed to and see edited versions of a file 131 that is stored on server 110 can be limited and controlled. Only those user's who are granted such permission in the access control list 134 of the unedited version of the file 131, can read the pointer 135 for the storage location of the edited version of the file.

Of course, in addition to storing a pointer 135 to the most recently edited version of a stored file 131, the server 110 can include in the database record 130 pointers to all of the edited versions of a file. In this way, when a user requests to see any one of the edited versions of the file, he or she can be presented with an option to view any other version of the file.

The methods described herein may be implemented in digital electronic circuitry, or in computer hardware, firmware, software, or in combinations of them. The methods may implemented as a computer program product, i.e., as a computer program tangibly embodied in a machine-readable storage device for execution by, or to control the operation of, a data processing apparatus such as a programmable processor, a computer, or multiple computers. A computer program can be written in any form of programming language, including a compiled or interpreted language, and can be deployed in any form, including as a stand-alone program or as a module, component, subroutine, plug-in or other unit suitable for use in a computing environment. A computer program can be deployed to be executed on one computer or on multiple computers at one site or distributed across multiple sites and interconnected by a communications network.

Processors suitable for the execution of a computer program include, by way of example, both general and special purpose microprocessors, and any one or more processors of any kind of digital computer, including digital signal processors. Generally, a processor will receive instructions and data from a read-only memory or a random access memory or both. Elements of a computer may include at least one processor for executing instructions and one or more memory devices for storing instructions and data. Generally, a computer may also include, or be operatively coupled to receive data from and/or transfer data to one or more mass storage devices for storing data, e.g., magnetic, magneto-optical disks, or optical disks.

Machine readable media suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry such as a FPGA (field programmable gate array) or as an ASIC (application-specific integrated circuit).

To provide for user interaction, the computer may include a display device, e.g., a cathode ray tube (CRT) or liquid crystal display (LCD) monitor, for displaying information to the user and a keyboard and a pointing device, e.g., a mouse, trackball or touch pad, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed apparatus and methods may be implemented on a computing system that includes a back-end component, e.g., a data server, or that includes a middleware component, e.g., an application server, or that includes a front-end component, e.g., a client computer having a graphical user interface or a Web browser through which a user can interact with any combination of such back-end, middleware, or front-end components. Components may be interconnected by any form or medium of digital data communication, e.g., a communication network, including a local area network (LAN) and a wide area network (WAN) such as the Internet.

A number of embodiments of the invention have been described above. Nevertheless, it will be understood that various modifications may be made without departing from the spirit and scope of the invention. For example, the logic flows depicted in the figures do not necessarily require the particular order shown, or sequential order, to achieve desirable results. In addition, other steps may be provided or eliminated from the described flows, and other components may be added to or removed from the described systems, without departing from the scope of the invention. Accordingly, other embodiments are within the scope of the following claims.

What is claimed is:

1. A computer implemented method for storing files on a cloud-based server, the method comprising:
   receiving, at the cloud-based server, from a client computer controlled by the user, a hash value for a file;
   determining, through at least one processor of the cloud-based server, whether a file with a hash value identical to the received hash value is already stored on the cloud-based server;
   if a file with a hash value identical to the received hash value is already stored on the cloud-based server, further:
      challenging the user's right to access the copy of the file that is stored on the cloud-based server;
      receiving the user's response to the challenge;
      determining whether the user has the right to access the copy of the file that is stored on the cloud-based server based on the user's response to the challenge; and
      granting the user the right to access the copy of the file that is stored on the cloud-based server when the user successfully responds to the challenge.

2. The computer implemented method of claim 1, further comprising:
   receiving, at the cloud-based server, a request from a user to store the file,
   if a file with a hash value identical to the received hash value is not already stored on the cloud-based server, sending to the client computer a request to send the file to the cloud-based server.

3. The computer implemented method of claim 1, further comprising, in response to the request to send the file to the cloud-based server:
   receiving from the client computer a copy of the file that the user requested to store on the cloud-based server;
   storing the copy of the file on the cloud-based server; and
   granting the user the right to access the copy of the file that is stored on the cloud-based server.

4. The computer implemented method of claim 3, wherein granting the user the right to access the file comprises providing the user a pointer to the file's storage location on the cloud-based server.

5. The computer implemented method of claim 4, further comprising associating, on the cloud-based server, a username of the user with a pointer to the file's storage location in a data repository.

6. The computer implemented method of claim 5, wherein the data repository is a database.

7. The computer implemented method of claim 1, wherein challenging the user's right to access the copy of the file that is stored on the cloud-based server comprises requesting the user to enter a password for the copy of the file that is stored on the cloud-based server.

8. The computer implemented method of claim 1, wherein challenging the user's right to access the copy of the file that is stored on the cloud-based server comprises requesting the client computer to send to the cloud-based server a portion of the file that the user has requested to store on the cloud-based server.

9. The computer implemented method of claim 1, wherein determining whether a file having a hash value identical to the received hash value is already stored on the cloud-based server comprises searching a repository on the cloud-based server for a file having a hash value identical to the received hash value.

10. The computer implemented method of claim 9, wherein searching a repository on the cloud-based server for a file having a hash value identical to the received hash value comprises querying a database for a record that includes the hash value of the file.

11. A computer implemented method, comprising:
    determining, at a client computer, a hash value for a file;
    sending, from the client computer, to the cloud-based server the hash value for the file;
    if a file with a hash value identical to the received hash value is already stored on the cloud-based server, further:
       challenging the user's right to access a copy of the file that is stored on the cloud-based server;
       receiving the user's response to the challenge;
       determining whether the user has the right to access the copy of the file that is stored on the cloud-based server based on the user's response to the challenge; and
       granting the user the right to access the copy of the file that is stored on the cloud-based server when the user successfully responds to the challenge; and
    receiving, at the client computer, a response from the cloud-based server granting access to a copy of the file that is stored on the cloud-based server.

12. The computer implemented method of claim 11, further comprising:
    receiving, at the client computer, a request from the cloud-based server to upload the file; and
    sending the file from the client computer to the cloud-based server.

13. The computer implemented method of claim 11, further comprising: receiving, at the client computer, a challenge to the right to access the file; and sending from the client computer to the cloud-based server a response to the challenge.

14. The computer implemented method of claim 13, wherein the received challenge to the right to access the file is a request for a password for the file, further comprising sending the cloud-based server a password for the file in response to the server's challenge to the right to access the file.

15. The computer implemented method of claim 13, wherein the received challenge to the right to access the file is a request to send a portion of the file further comprising sending to the cloud-based server a portion of the file in response to the cloud-based server's challenge to the right to access the file.

16. The computer implemented method of claim 11, wherein receiving a response from the cloud-based server granting access to a copy of the file stored on the cloud-based server comprises receiving from the cloud-based server a pointer to the file's storage location on the cloud-based server.

17. A computer program product, stored on a tangible machine readable medium, comprising instructions operable to cause one or more programmable processors of a computer system to:
    receive, at the cloud-based server, from a client computer controlled by the user, a hash value for a file;
    determine whether a file with a hash value identical to the received hash value is already stored on the cloud-based server; and
    if a file with a hash value identical to the received hash value is already stored on the server further cause the one or more programmable processors of the computer system to:
        challenge the user's right to access the copy of the file that is stored on the cloud-based server;
        receive the user's response to the challenge;
        determine whether the user has the right to access the copy of the file that is stored on the cloud-based server based on the user's response to the challenge; and
        grant the user the right to access the copy of the file that is stored on the cloud-based server when the user successfully responds to the challenge.

18. The computer program product of claim 17, further comprising instructions operable to cause one or more programmable processors of a computer system to:
    receive, at a cloud-based server, a request from a user to store a file; and
    if a file with a hash value identical to the received hash value is not already stored on the cloud-based server, send to the client computer a request to send the file to the cloud-based server.

19. The computer program product of claim 18 further comprising instructions operable to cause the one or more programmable processors of the computer system to:
    receive from the client computer a copy of the file that the user requested to store on the cloud-based server;
    store the copy of the file on the cloud-based server; and
    grant the user the right to access the copy of the file that is stored on the cloud-based server.

20. The computer program product of claim 17, wherein challenging the user's right to access the copy of the file that is stored on the cloud-based server comprises requesting the client computer to send to the cloud-based server a portion of the file that the user has requested to store on the cloud-based server.

* * * * *